United States Patent
Choi (10) Patent No.: US 7,224,655 B2
(45) Date of Patent: May 29, 2007

(54) APPARATUS METHOD FOR DETECTING TILT AT INNER AND OUTER CIRCUMFERENCE AND DETERMINING TILT DEGREE BASED ON TIMES WHEN FOCUS ERROR SIGNALS ARE DETECTED

(75) Inventor: Bong-hwoan Choi, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 570 days.

(21) Appl. No.: 10/700,471

(22) Filed: Nov. 5, 2003

(65) Prior Publication Data

US 2004/0090619 A1 May 13, 2004

(30) Foreign Application Priority Data

Nov. 13, 2002 (KR) .................... 10-2002-0070457

(51) Int. Cl.
*G11B 7/095* (2006.01)
(52) U.S. Cl. .................. 369/53.19; 369/44.32
(58) Field of Classification Search ............ 369/44.11, 369/53.19, 44.32
See application file for complete search history.

(56) References Cited

U.S. PATENT DOCUMENTS

| | | | | |
|---|---|---|---|---|
| 6,137,754 A | * | 10/2000 | Furukawa et al. | 369/44.32 |
| 6,363,039 B2 | * | 3/2002 | Hayashi et al. | 369/44.32 |
| 6,714,496 B2 | * | 3/2004 | Park et al. | 369/53.19 |
| 6,754,145 B1 | * | 6/2004 | Shimamoto et al. | 369/44.32 |
| 6,963,462 B2 | * | 11/2005 | Satoh | 360/63 |
| 2002/0060964 A1 | * | 5/2002 | Park | 369/53.19 |

FOREIGN PATENT DOCUMENTS

| | | | | |
|---|---|---|---|---|
| JP | 10222860 A | * | 8/1998 | |
| KR | 10 2000 0066667 | | 11/2000 | |
| KR | 1020000074297 | | 12/2000 | |

OTHER PUBLICATIONS

English Translation of Korean Office Action.

* cited by examiner

*Primary Examiner*—Gautam R. Patel
(74) *Attorney, Agent, or Firm*—Staas & Halsey LLP

(57) ABSTRACT

An apparatus and method for detecting a tilted disc, and an apparatus and method for reproducing data from the tilted disc are provided. The method for detecting a tilted disc comprises: radiating light on a predetermined location at the inner circumference of an optical disc and moving a pickup away from the optical disc; measuring a time T1 at which a focus error signal, generated when light is reflected from a recording layer of the optical disc, is output; radiating light on a predetermined location at the outer circumference of the optical disc and moving the pickup unit away from the optical disc; measuring a time T2 when a focus error signal, generated when light is reflected from the recording layer of the optical disc, is output; determining a tilt degree indicating value T which is a value for determining whether the optical disc is a tilted disc, using the measured times T1 and T2; and comparing the tilt degree indicating value T with a predetermined reference value R and determining whether the optical disc is a tilted disc.

18 Claims, 5 Drawing Sheets

APPARATUS METHOD FOR DETECTING TILT AT INNER AND OUTER CIRCUMFERENCE AND DETERMINING TILT DEGREE BASED ON TIMES WHEN FOCUS ERROR SIGNALS ARE DETECTED

CROSS-REFERENCE TO RELATED APPLICATIONS

This application claims the priority of Korean Patent Application No. 2002-70457, filed on Nov. 13, 2002, in the Korean Intellectual Property Office, the disclosure of which is incorporated herein in its entirety by reference.

BACKGROUND OF THE INVENTION

1. Field of the Invention

The present invention relates to an apparatus and method for detecting a tilted disc and for reproducing data recorded on the disc, and more particularly, to an apparatus and method for detecting a tilted disc using a focus error signal and for reproducing data recorded on the tilted disc.

2. Description of the Related Art

Optical discs are designed to be manufactured in a flat shape in which the plain of the recording surface is supposed to be parallel to the horizontal axis of the disc. However, a slight tilt, i.e., an inclination angle of a recording surface can be found in most optical discs. This tilt is result of disc distortion occurring during the injection and curing operations of the manufacturing process. An optical disc in which the recording surface is not perfectly parallel to the horizontal axis is referred to as a tilted disc.

Figure 1:
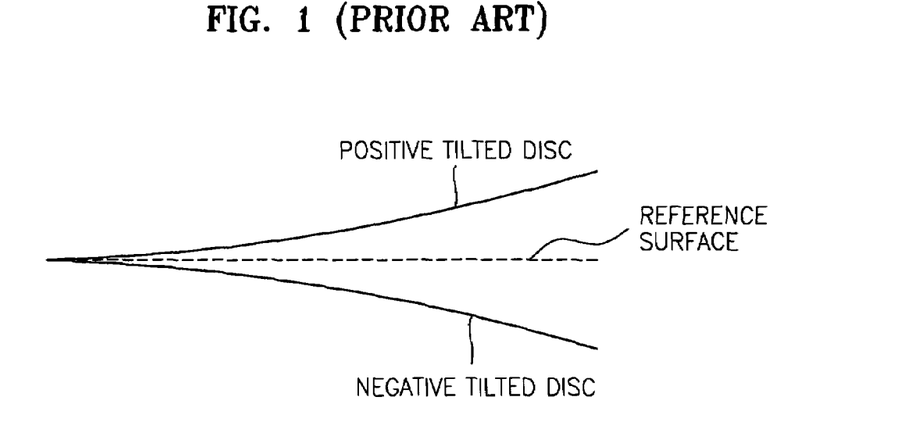
FIG. 1 illustrates an example of a tilted disc.

FIG. 1 illustrates an example of a tilted disc. An optical disc of with a recording surface that is offset in an upward direction with respect to a level reference surface, is referred to as a positive tilted disc. An optical disc with a recording surface that is offset in a downward direction with reference to a level reference surface, is referred to as a negative tilted disc. Positive tilted discs and negative tilted discs are referred to as a radial tilted discs.

Data cannot be correctly read from a tilted disc when the tilt degree exceeds a tolerance limit. If the tilt degree exceeds a tolerance limit when data is read from a tilted disc, the data cannot be correctly read. When an apparatus for reproducing data from an optical disc cannot recognize the optical disc due to excessive tilt data reproduction is not possible.

SUMMARY OF THE INVENTION

Additional aspects and/or advantages of the invention will be set forth in part in the description which follows and, in part, will be obvious from the description, or may be learned by practice of the invention.

The present invention provides an apparatus and method for detecting a tilted disc. The tilt is simply and accurately detected using a focus error signal.

The present invention also provides an apparatus and method for reproducing data recorded on a titled disc, data reproduction being performed with increased reliability.

According to an aspect of the present invention, the apparatus for detecting a tilted disc includes a pickup unit which radiates light on an optical disc, receives light reflected from the optical disc, and outputs an electrical signal corresponding to the amount of the reflected light. A focus error signal generation unit receives the electrical signal from the pickup unit and generates a focus error signal. A pickup driving unit controls the pickup unit that radiates light on the optical disc. A control unit measures the time T1 the focus error signal generation unit outputs a focus error signal generated when light is reflected by the recording layer of the optical disc by radiating light on a predetermined location of the inner circumference of the optical disc and then moving the pickup unit near the optical disc. The control unit also measures a time T2 at and/or during which the focus error signal generation unit outputs a focus error signal generated when light is reflected by the recording layer of the optical disc by radiating light on a predetermined location on an outer circumference of the optical disc and moving the pickup unit near the optical disc. The control unit then determines a tilt degree indicating value T which is a value for determining whether the optical disc is a tilted disc. Using the measured times T1 and T2, the control unit compares the tilt degree indicating value T with a predetermined reference value R, and determines whether the optical disc is a tilted disc.

If the optical disc is determined to be as a tilted disc, the control unit will determine that the optical disc is a positive tilted disc if the tilt degree indicating value T is greater than a value obtained by subtracting the time T1 from the time T2, and the control unit will determine that the optical disc is a negative tilted disc, if the tilt degree indicating value T is smaller than the value obtained by subtracting the time T1 from the time T2.

According to another aspect of the present invention, a method for detecting a tilted disc includes: radiating light on a predetermined location of the inner circumference of an optical disc and moving the pickup unit near the optical disc; measuring a time T1 when a focus error signal, generated when light is reflected from a recording layer of the optical disc, is output; radiating light on a predetermined location of the outer circumference of the optical disc and moving the pickup unit near the optical disc; measuring a time T2 when a focus error signal, generated when light is reflected from the recording layer of the optical disc, is output; determining a tilt degree indicating value T, which is a value for determining whether the optical disc is a tilted disc, using the measured times T1 and T2; and comparing the tilt degree indicating value T with a predetermined reference value R and determining whether the optical disc is a tilted disc.

If the optical disc is determined to be a tilted disc, the method may further include determining if the tilt degree indicating value T is greater than a value obtained by subtracting the time T1 from the time T2, which indicates that the optical disc is a positive tilted disc, and/or determines if the tilt degree indicating value T is smaller than the value obtained by subtracting the time T1 from the time T2, which indicates that the optical disc is a negative tilted disc.

According to another aspect of the present invention, an apparatus for reproducing data recorded on an optical disc is provided, wherein the control unit restricts a maximum reproduction speed to a predetermined reproduction speed if the disc is determined to be a tilted disc.

According to another aspect of the present invention, an apparatus for reproducing data recorded on an optical disc is provided, wherein the control unit determines a tilt angle of a tilted disc at a predetermined location on the optical disc and compensates for tilt angle of the optical disc by adjusting the pickup angle of the pickup unit to correspond to the tilt angle at the predetermined location on the optical disc.

According to another aspect of the present invention, when the data recorded on a tilted optical disc is reproduced, the maximum reproduction speed is reduced to a predetermined reproduction speed.

According to another aspect of the present invention, the tilt angle of a tilted disc is determined at a predetermined location on the optical disc, and the pickup angle of the pickup unit is adjusted to compensate for the tilt angle at a predetermined location on the optical disc.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

An apparatus for detecting a tilted disc, according to the present invention, will be described with reference to FIGS. 2 and FIGS. 3A through 3C.

Figure 2:
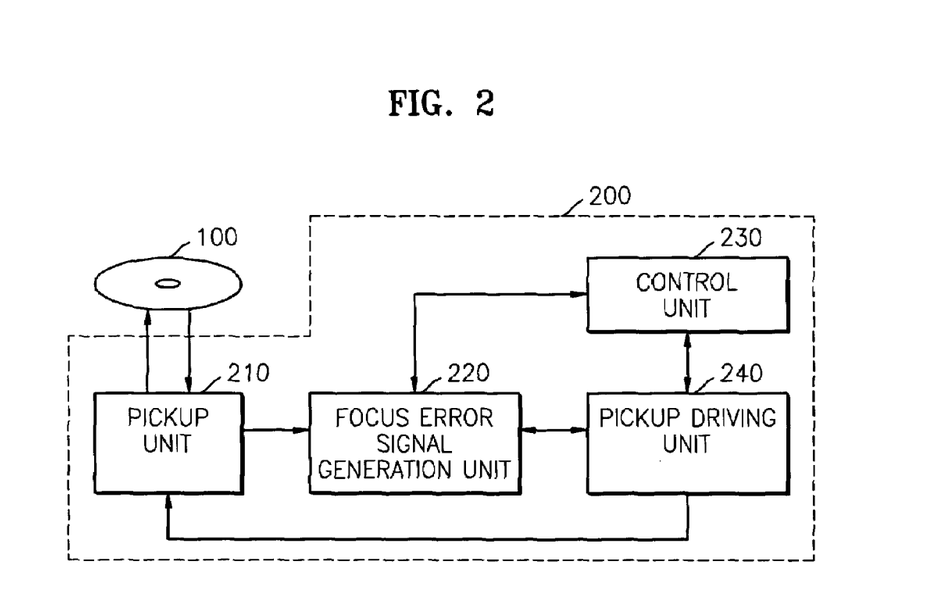
FIG. 2 is a block diagram for explaining an apparatus for detecting a tilted disc, according to the present invention.

FIG. 2 is a block diagram for explaining an apparatus 200 for detecting a tilted disc, according to the present invention. Referring to FIG. 2, the apparatus 200 includes a pickup unit 210, a focus error signal generation unit 220, a control unit 230, and a pickup driving unit 240.

The pickup unit 210 includes a laser diode (not shown) which radiates a laser light, an objective lens (not shown), a step motor (not shown) which moves the objective lens, and a photo diode (not shown) which receives light reflected from a disc 100. Light is irradiated from the laser diode of the pickup unit 210, toward the optical disc 100 in response to a pickup driving signal from the pickup driving unit 240. The photo diode receives light reflected from the optical disc 100 and outputs a current proportional to the amount of reflected light. An I/V amplifier (not shown) in the pickup unit 210 converts the current into a voltage and outputs the voltage to the focus error signal generation unit 220.

The focus error signal generation unit 220 receives the voltage proportional to the intensity of light reflected from the optical disc 100 and generates a focus error signal.

The pickup driving unit 240 outputs a pickup driving signal to the pickup unit 210, in response to a control command from the control unit 230, and controls the pickup unit 210 to radiate light on the optical disc 100.

The control unit 230 determines whether the optical disc 100 is a tilted disc based on the focus error signal.

When the optical disc 100 is loaded into an apparatus for reproducing an optical disc, according to the present invention, the control unit 230 measures a reference output level $V_{ref}$ of the focus error signal generation unit 220.

Figure 3A:
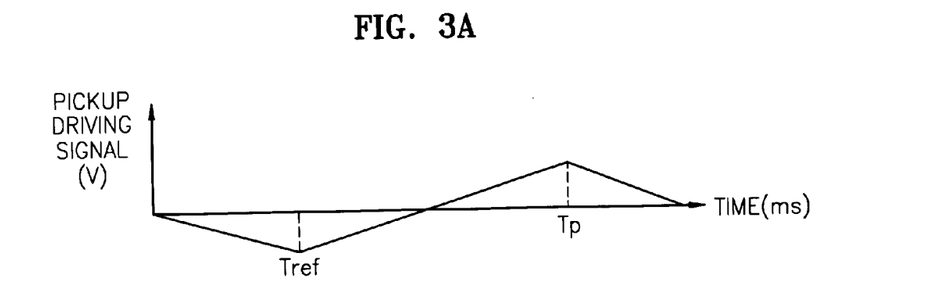
FIGS. 3A through 3C illustrate signals for explaining an operation of the apparatus shown in FIG. 2.
Figure 3B:
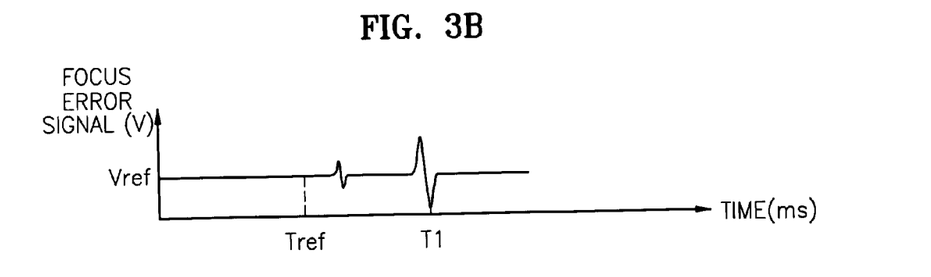
Figure 3C:
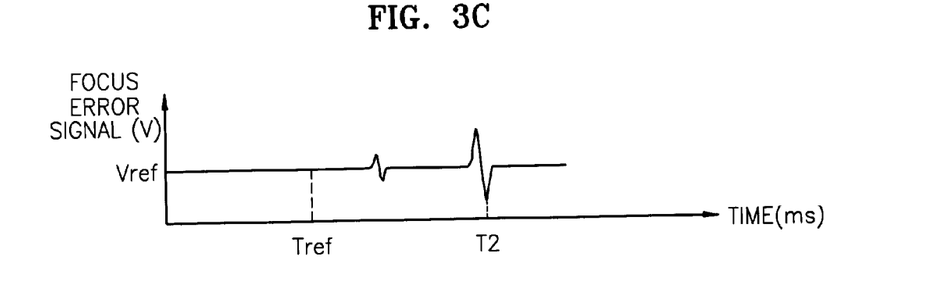

FIGS. 3A through 3C illustrate a pickup driving signal and focus error signals.

When the optical disc 100 is rotated by a spindle motor (not shown) via a control command from the control unit 230, light is irradiated from the laser diode of the pickup unit 210 to a predetermined location on the inner circumference of the optical disc 100. The predetermined location on the inner circumference of the optical disc 100 is chosen because it is a location where the disc 100 has minimal little tilt. For example, a location where a data reproducing time is about 2 seconds is desirable.

The pickup driving unit 240 outputs the pickup driving signal shown in FIG. 3A to the pickup unit 210. The pickup unit 210 moves in a toward the disc 100 for a time $T_{ref}$ to a point where it is separated from the optical disc 100 by a predetermined distance. Then, the pickup unit 210 moves in away from the disc 100 at a predetermined speed, for a period from $T_{ref}$ to $T_p$. As the pickup unit 210 moves, the laser diode of the pickup unit 210 moves in towards and away from the optical disc 100, and light is repeatedly irradiated at the predetermined location on the inner circumference of the optical disc 100.

A focus error signal output from the focus error signal generation unit 220 in response to the pickup driving signal shown in FIG. 3A is presented in FIG. 3B.

In a section where focusing is not performed, a signal having almost the same level as $V_{ref}$ is output. An S-shaped signal which is first output after the time $T_{ref}$, is a focus error signal generated by light reflected from the surface layer of the optical disc 100.

The S-shaped signal which appears next, is a focus error signal generated by light reflected from the recording layer in which data of the optical disc 100 is recorded. The S-shaped focus error signal is referred to as an S signal. The control unit 230 repeatedly receives a focus error signal from the focus error signal generation unit 220, observes the output level of the focus error signal, and determines that the focus error signal is the S signal when the output level is a predetermined amount greater than $V_{ref}$ and then smaller than $V_{ref}$. The control unit 230 determines that focusing has been performed when the S signal is output. In FIG. 3B, a time T1 represents the time of which the control unit 230 determines the focus error signal is the S signal. The control unit 230 stores an interval $T1-T_{ref}$, which is a time interval from $T_{ref}$ to T1.

Since there is minimal tilt on the inner circumference of the optical disc 100, the time T1 when the S signal is output is similar to that found in an untilted optical disc. However, as the tilt degree becomes larger towards the outer circumference of the optical disc 100, a time when an S signal is output in response to light reflected from a predetermined location on the outer circumference of the optical disc 100, may be longer or shorter than the time T1. Thus, the presence and degree of the tilt of the optical disc can be known by comparing the time when the S signal corresponding to the outer circumference of the optical disc 100 is output with the time when the S signal corresponding to the inner circumference of the optical disc 100 is output.

Measuring and storing operations of the time T1 when the S signal corresponding to the predetermined location on the inner circumference of the optical disc 100 is output, are performed during an optical disc detection operation at a first stage when the optical disc 100 is loaded into the apparatus for reproducing an optical disc. Optical disc detection is used to determine whether a loaded disc is a CD, DVD, CD-R, or CD-RW.

After the time T1 is measured, the control unit 230 controls the pickup driving unit 240 and moves the pickup unit 210 so that the laser diode radiates light on a predetermined location on the outer circumference of the optical disc 100. As the predetermined location on the outer circumference of the optical disc 100 approaches a location where a tilt degree is remarkably large, the accuracy of detecting a tilted disc is improved. For example, a predetermined location on the outer circumference of the optical disc 100 is a location where a data reproducing time is about 60 minutes is preferable. Even in case of a CD having a data reproducing time shorter than that of a DVD, over 60 minutes of data can be recorded on the CD. The location where the data reproducing time corresponds to 60 minutes can be used in both CD and DVD.

The control unit 230 controls the pickup driving unit 240 which outputs the pickup driving signal shown in FIG. 3A. As in the case where the time T1 is measured, the pickup unit 210, moves the laser diode toward the optical disc 100 for a time $T_{ref}$ so that the laser diode is positioned a predetermined distance from the optical disc 100. The laser diode then moves away from the optical disc 100 at a predetermined speed for a period from $T_{ref}$ to $T_p$.

FIG. 3C illustrates a focus error signal output from the focus error signal generation unit 220 when light is irradiated on a predetermined location on the outer circumference of the optical disc 100 while the laser diode of the pickup unit 210 is moved towards and away from the optical disc 100.

The initial S-shaped signal, as in FIG. 3B, is a focus error signal generated by light reflected from the surface layer of the optical disc 100, and the second S-shaped signal is an S signal generated by light reflected from the recording layer in which data of the optical disc 100 is recorded.

In FIG. 3C, the time T2 represents a time when the control unit 230 detects the the S signal. The control unit 230 stores $T2-T_{ref}$, which is a time interval from $T_{ref}$ to T2. A reference time $T_{ref}$ is the same time as in FIGS. 3A through 3C.

The control unit 230 determines a tilt degree indicating value T, which indicates a tilt degree of the optical disc 100, by using the times T1 and T2.

The tilt degree indicating value T may be obtained by equation 1.

$$T=|T2-T1| \quad (1)$$

If the optical disc 100 is a positive tilted disc, the time T2 will be longer than the time T1. This is because the positive tilt is closer to the pickup than the reference surface of a nontilted optical disc would be as shown in FIG. 1. The pickup unit 210 moves away from the optical disc 100 while radiating light so that focusing is performed on the recording layer of the optical disc 100. For similar reasons, if the optical disc 100 is a negative tilted disc, the time T2 will be shorter than the time T1.

The control unit 230 compares the tilt degree indicating value T with a predetermined reference value R and determines whether the optical disc 100 is a tilted disc. There may be some difference between the times T2 and T1 or caused by other factors. Thus, the reference value R is provided to account for error not attributable to disc tilt. When the tilt degree indicating value T is greater than the reference value R, the control unit 230 determines that the optical disc 100 is a tilted disc.

If the optical disc 100 is determined to be a tilted disc, the control unit 230 determines the sign of tilt, that is, whether the tilt is a positive tilt or a negative tilt.

As described above, when the optical disc 100 is a positive tilted disc, (T2−T1) is a positive number, and when the optical disc 100 is a negative tilted disc, (T2−T1) is a negative number.

As described above, when an optical disc loaded into an apparatus for reproducing an optical disc according to the present invention is detected as a tilted disc, a control for improving readability of data according to the tilt of the disc is desirable.

Hereinafter, several methods for improving the readability of data recorded on an optical disc detected as a tilted disc will be described.

First, if the optical disc 100 is detected as a tilted disc, the control unit 230 can improve readability of data by limiting a reproduction speed of the optical disc 100 to a predetermined reproduction speed. For example, in an apparatus for reproducing an optical disc having a maximum reproduction speed of 16×, if the loaded optical disc is detected as the tilted disc, the possibility of errors occurring when the data is read from the tilted disc can be reduced by reducing the maximum reproduction speed to a speed of 12×. The maximum reproduction speed of 16× and the reduced speed of 12× are merely examples. The max speed could be 36×, 46×, or any max speed according to the current technology, and the reduced speed can be any speed below that.

In case of a tilted disc, a restricted maximum reproduction speed is predetermined and input into the control unit 230.

In one aspect of the present invention, if the optical disc 100 is determined to be a tilted disc, the optical disc is restricted to a fixed maximum reproduction speed regardless of a tilt degree.

In another aspect of the present invention, a maximum reproduction speed is determined depending on a tilt degree indicating value T. As the tilt degree indicating value T increases due to an increased tilt degree, the maximum reproduction speed is reduced. Here the reduction of speed is dependent on the degree of tilt. For minor tilt the speed is reduced only a small degree, however, for a large tilt, the speed can be greatly reduced.

In order to improve the readability of data recorded on a tilted disc, the angle of the pickup unit 210, the pickup unit 210 balances the inclination of the tilted disc by adjusting the pickup angle with the same angle as the tilt degree.

Figure 6:
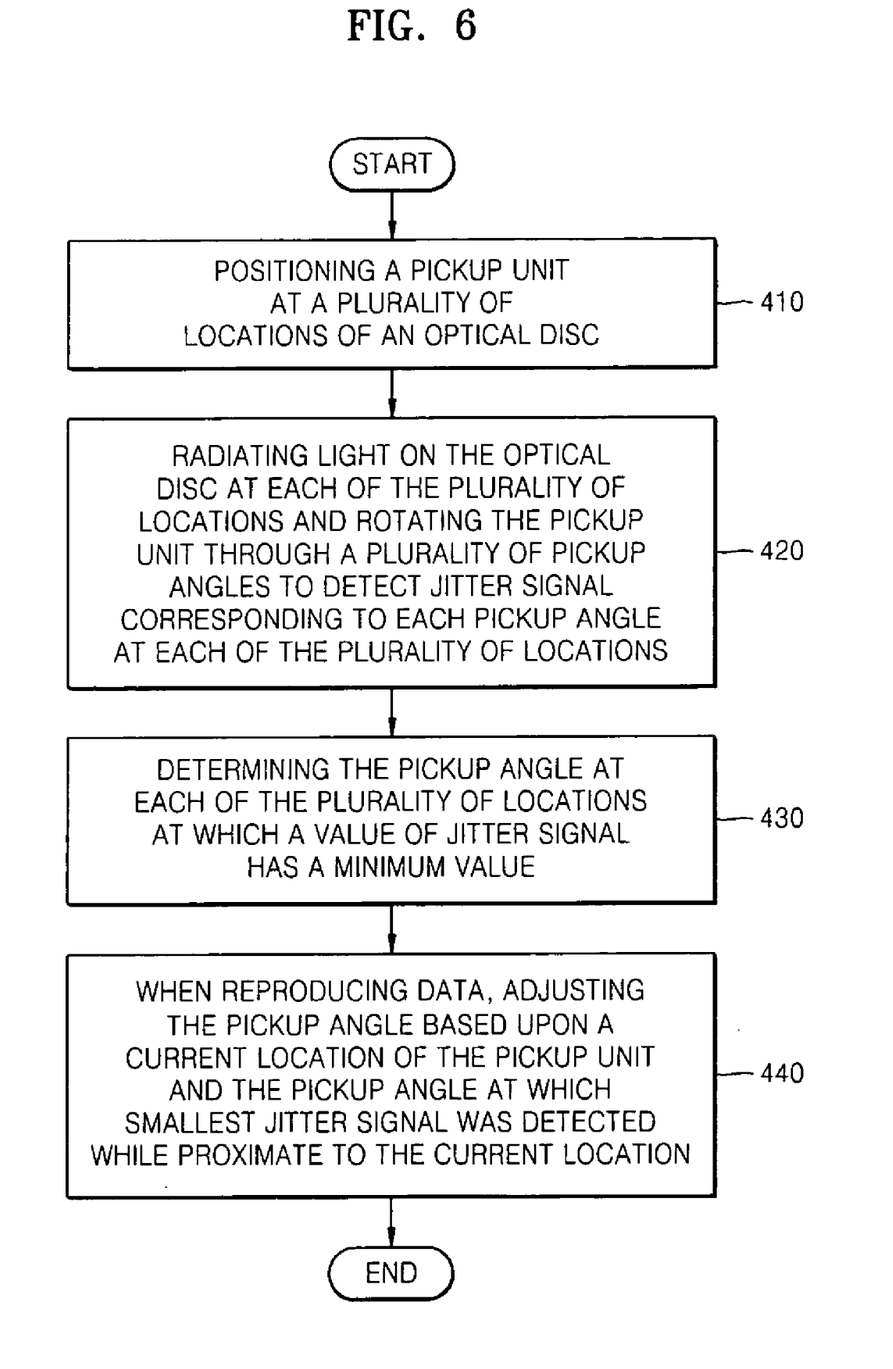
FIG. 6 is a flowchart for explaining a method of adjusting a pickup angle after a tilted disc is detected.

In an aspect of the present invention, the pickup angle of the pickup unit 210 is adjusted with reference to operations 410 through 440 of FIG. 6 as follows.

The pickup unit 210 is positioned at a plurality of locations of the optical disc 100 (operation 410) Light is irradiated on N locations including first, second, and N-th locations of a region of the optical disc 100 on which data is recorded, then a jitter signal is generated according to the light reflected from the optical disc 100 (operation 420).

In other words, the pickup angle of the pickup unit 210 in which the value of the jitter signal is a minimum value, is determined by radiating light on the optical disc 100 while changing the pickup angle of the pickup unit 210 (operations 420 and 430). N angles of the pickup unit 210 including first, second, and N-th angles are determined at each of the N locations. An interval between the N locations on the optical disc 100 on which light is irradiated may be large on an inner circumference of the optical disc 100 and small on an outer circumference of the optical disc 100.

After the N angles of the pickup unit 210 are determined at each of the N locations, when the data recorded on the optical disc 100 is reproduced, the pickup unit 210 maintains the first angle during a data duration from the first location to the second location and maintains the second angle during a data duration from the second location to the third location. The pickup angle of the pickup unit 210 is adjusted during the other durations in the same way (operation 440).

Hereinafter, a method for detecting a tilted disc according to the present invention will be described with reference to FIGS. 2, 4, and 5.

Figure 4:
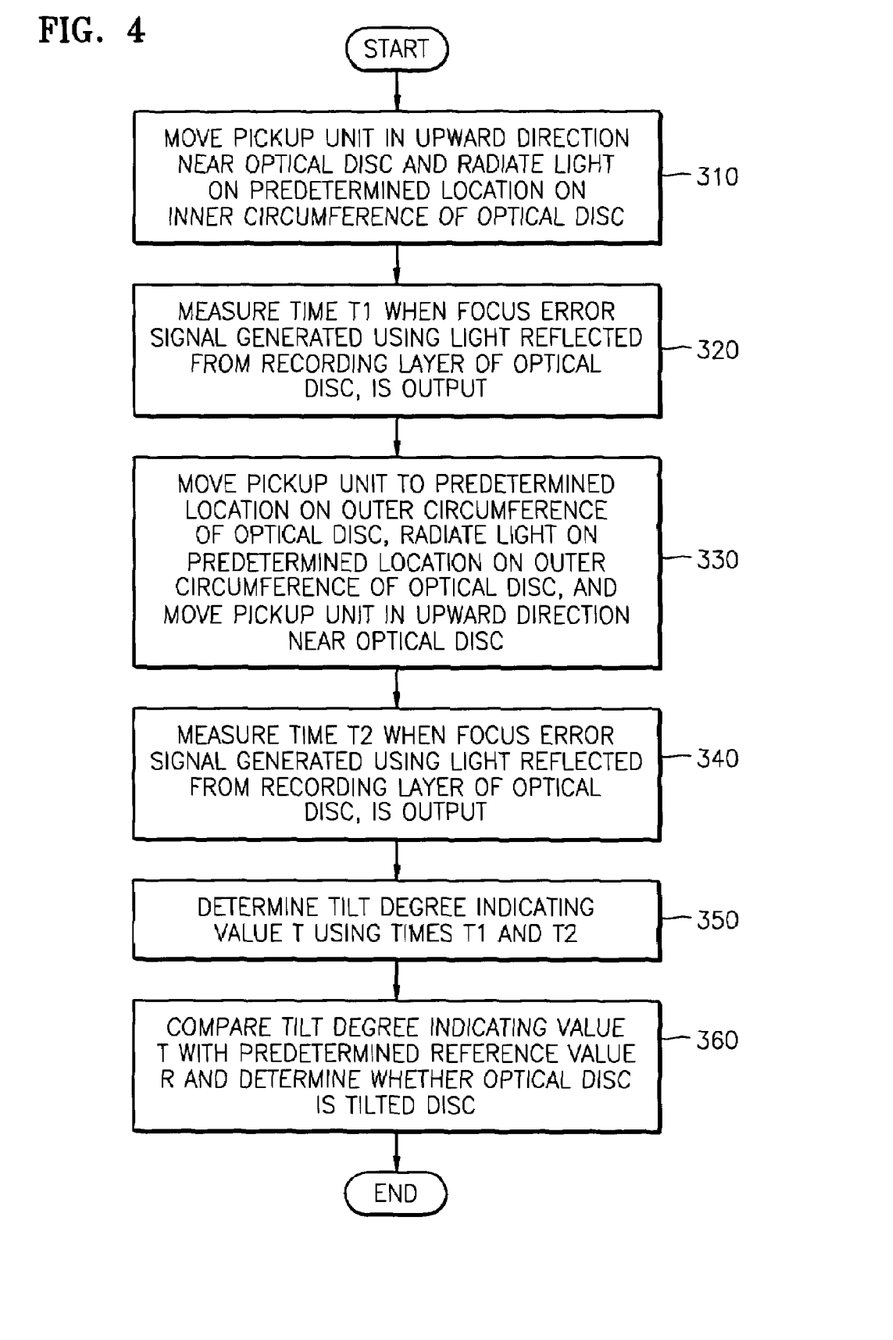
FIG. 4 is a flowchart for explaining a method for detecting a tilted disc, performed in the apparatus shown in FIG. 2.

FIG. 4 is an example of a flowchart for explaining a method for detecting a tilted disc performed by the apparatus shown in FIG. 2.

In operation 310, the pickup unit 210 radiates light on a predetermined location at the inner circumference of the optical disc 100 via a control command from the pickup driving unit 240. The pickup unit is then moved towards the optical disc 100.

In operation 320, the control unit 230 measures a time T1 at which an S signal, which is a focus error signal generated using light reflected from a recording layer of the optical disc 100, is output.

In operation 330, the pickup unit 210 moves to a predetermined location at the outer circumference of the optical disc 100, radiates light on the predetermined location, and moves towards the optical disc 100.

In operation 340, the control unit 230 measures a time T2 at which an S signal, which is a focus error signal generated using light reflected from the recording layer of the optical disc 10, is output.

In operation 350, the control unit 230 determines a tilt degree indicating value T, which is a value for determining whether the optical disc 100 is a tilted disc, using the times T1 and T2.

In operation 360, the control unit 230 compares the tilt degree indicating value T with a predetermined reference value R and determines whether the optical disc 100 is a tilted disc.

Figure 5:
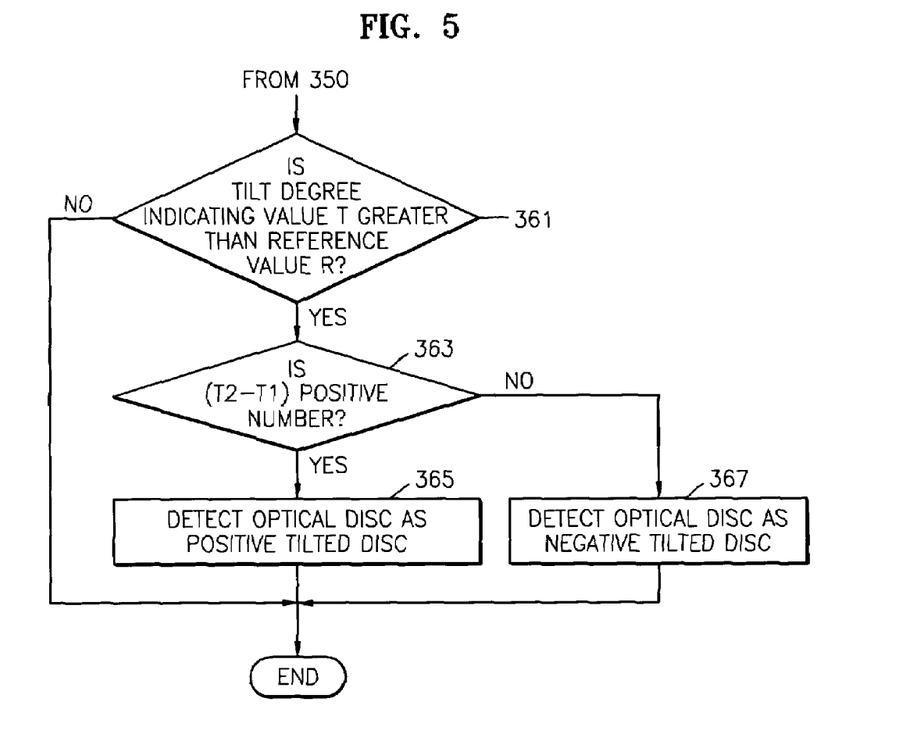
FIG. 5 is a detailed flowchart illustrating operation 360 of FIG. 4.

FIG. 5 is a detailed flowchart illustrating step 360 of FIG. 4.

In operation 361, if the tilt degree indicating value T is greater than the reference value R, the control unit 230 determines that the optical disc 100 is a tilted disc.

In operation 363, if the optical disc 100 is determined to be a tilted disc, the control unit 230 then determines whether (T2−T1) is a positive number.

In operation 365, if (T2−T1) is the positive number, the control unit 230 determines that the optical disc 100 is a positive tilted disc.

In operation 367, if (T2−T1) is a negative number, the control unit 230 determines that optical disc 100 is a negative tilted disc.

If the optical disc 100 is determined to be a tilted disc, as described above, the control unit 230 restricts the maximum reproduction speed of the optical disc 100 to a predetermined reproduction speed or enables the pickup unit 210 to balance the tilt of the optical disc 100. The tilt is adjusted by adjusting the pickup angle of the pickup unit 210 to coincide with the tilt angle of the optical disc 100. This is done using a jitter signal generated by reflected light at a plurality of locations on the data region, thereby improving the readability of data recorded on the optical disc 100.

The present invention may be embodied as a computer code, which can be read by a computer, on a computer readable recording medium. The computer readable recording medium includes all manner and types of recording apparatuses on which computer readable data are stored.

The computer readable recording media includes at least storage media such as magnetic storage media (e.g., ROM's, floppy disks, hard disks, etc.), optically readable media (e.g., CD-ROMs, DVDs, etc.), and carrier waves (e.g., transmissions over the Internet). Also, the computer readable recording media can be distributed to computer systems connected through a network and can be stored and executed as a computer readable code in a distributed mode.

As described above, the apparatus and method for detecting a tilted disc according to the present invention utilizes the difference between a normal optical disc and a tilted disc specifically a time when the S signal, which is a focus error signal generated when light is reflected from a recording layer on which data is recorded, is output is used. Thereby, simple and accurate detection of a tilted disc is possible.

In addition, when a tilted disc is reproduced, either a reproduction speed is restricted, or the pickup unit compensates for the tilt of the optical disc by adjusting the pickup angle of the pickup unit. The present invention solves the problem where an apparatus for reproducing an optical disc cannot recognize the optical disc and/or cannot perform data reproduction.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for detecting a tilted disc, the method comprising:
   positioning a pickup unit at a first predetermined location on an inner circumference of an optical disc;
   radiating light on the optical disc at the first predetermined location;
   moving the pickup unit away from the optical disc;
   moving the pickup unit towards the optical disc;
   measuring a time T1 at which a first focus error signal, generated when light is reflected from a recording layer of the optical disc, is output;
   positioning the pickup at a second predetermined location on an outer circumference of the optical disc;
   radiating light on the optical disc at the second predetermined location;
   moving the pickup unit away from the optical disc;
   moving the pickup unit towards the optical disc;
   measuring a time T2 at which a second focus error signal, generated when light is reflected from the recording layer of the optical disc, is output;
   determining a tilt degree indicating value T, using the measured times T1 and T2; and
   comparing the tilt degree indicating value T with a predetermined reference value R to determine if the optical disc is the tilted disc.

2. The method of claim 1, wherein the time T1 is a time interval from a predetermined reference time to a time when the first focus error signal is output, and the time T2 is a time interval from the predetermined reference time to a time when the second focus error signal is output.

3. The method of claim 1, wherein the tilt degree indicating value T is obtained by the following equation:

$$T=|T2-T1|.$$

4. The method of claim 1, wherein if the tilt degree indicating value T is greater than the predetermined reference value R, the optical disc is determined to be tilted.

5. The method of claim 1, wherein the optical disc is determined to be a positive tilted disc if the time T2 is greater than the time T1 and the optical disc is determined to be a negative tilted disc if the time T2 is less than the time T1.

6. An apparatus for determining if an optical disc is a tilted disc, the apparatus comprising:
a pickup unit which,
radiates light on the optical disc,
receives light reflected from the optical disc, and
outputs an electrical signal corresponding to the amount of the reflected light;
a focus error signal generation unit which receives the electrical signal from the pickup unit and generates a focus error signal;
a pickup driving unit which controls the pickup unit; and
a control unit which,
measures a time T1 at which the focus error signal generation unit outputs a focus error signal generated when light is reflected from a recording layer of the optical disc by radiating light on a predetermined location on an inner circumference of the optical disc and moving the pickup unit towards the optical disc,
measures a time T2 when the focus error signal generation unit outputs a focus error signal generated when light is reflected from the recording layer of the optical disc by radiating light on a predetermined location on an outer circumference of the optical disc and moving the pickup unit towards the optical disc,
determines a tilt degree indicating value T to determine if the optical disc is tilted, using the measured times T1 and T2,
compares the tilt degree indicating value T with a predetermined reference value R, and
determines whether the optical disc is tilted.

7. The apparatus of claim 6, wherein the times T1 and T2 are time intervals from a predetermined reference time to a time when the corresponding focus error signals are output.

8. The apparatus of claim 6, wherein the control unit obtains the tilt degree indicating value T using the following equation:

$$T=|T2-T1|.$$

9. The apparatus of claim 6, wherein if the tilt degree indicating value T is greater than the predetermined reference value R, the control unit determines that the optical disc is tilted.

10. The apparatus of claim 6, wherein the control unit determines that the optical disc is a positive tilted disc if the time T2 is greater than the time T1, and the control unit determines that the optical disc is a negative tilted disc, if the time T1 is greater than the time T2.

11. The apparatus of claim 6, wherein the control unit restricts a maximum reproduction speed to a predetermined reproduction speed.

12. The apparatus of claim 11, wherein the predetermined reproduction speed is uniform regardless of a tilt degree of the optical disc.

13. The apparatus of claim 11, wherein the predetermined reproduction speed is determined based on the tilt degree indicating value T.

14. The apparatus of claim 6, wherein the control unit determines a tilt angle at a predetermined location of the optical disc on which light is to be irradiated, compensates for the tilt angle of the optical disc by adjusting a pickup angle of the pickup unit to correspond to the tilt angle at the predetermined location of the optical disc.

15. The apparatus of claim 14, wherein the control unit:
positions the pickup unit at a plurality of locations of the optical disc;
radiates light on the optical disc at each of the plurality of locations;
rotates the pickup unit through a plurality of pickup angles to detect a jitter signal that corresponds to each pickup angle;
determines the pickup angle at each of the plurality of locations at which a value of the jitter signal has a minimum value; and
when reproducing data, adjusts the pickup angle based upon a current location of the pickup unit and the pickup angle at which the smallest jitter signal was detected while proximate to the current location.
when the predetermined location on which light is to be irradiated is between an n-th location and a (n+1)-th location (where n is an integer greater than 1 and less than N), determines the tilt angle of the optical disc as the pickup angle of the pickup unit determined at the n-th location.

16. A computer readable medium on which a program for implementing a method for if an optical disc is tilted is recorded, wherein the method comprises:
positioning a pickup unit at a first predetermined location on an inner circumference of the optical disc;
radiating light on the optical disc at the first predetermined location;
moving the pickup unit away from the optical disc;
moving the pickup unit towards the optical disc;
measuring a time T1 at which a first focus error signal, generated when light is reflected from a recording layer of the optical disc, is output;
positioning the pickup at a second predetermined location on an outer circumference of the optical disc;
radiating light on the optical disc at the second predetermined location;
moving the pickup unit away from the optical disc;
moving the pickup unit towards the optical disc;
measuring a time T2 at which a second focus error signal, generated when light is reflected from the recording layer of the optical disc, is output;
determining a tilt degree indicating value T, using the measured times T1 and T2; and
comparing the tilt degree indicating value T with a predetermined reference value R to determine if the optical disc is tilted.

17. A method of determining if an optical disc is a tilted disc and reproducing data recorded on the optical disc, the method comprising:
positioning a pickup unit at a first predetermined location on an inner circumference of the optical disc;
radiating light on the optical disc at the first predetermined location;
moving the pickup unit away from the optical disc;
moving the pickup unit towards the optical disc;
measuring a time T1 at which a first focus error signal, generated when light is reflected from a recording layer of the optical disc, is output;
positioning the pickup at a second predetermined location on an outer circumference of the optical disc;
radiating light on the optical disc at the second predetermined location;
moving the pickup unit away from the optical disc;
moving the pickup unit towards the optical disc;
measuring a time T2 at which a second focus error signal, generated when light is reflected from the recording layer of the optical disc, is output;
determining a tilt degree indicating value T, using the measured times T1 and T2; and comparing the tilt degree indicating value T with a predetermined reference value R to determine if the optical disc is a tilted disc, and, if the disc is determined to be a tilted disc;

positioning a pickup unit at a plurality of locations of an optical disc;

radiating light on the optical disc at each of the plurality of locations;

rotating the pickup unit through a plurality of pickup angles to detect a jitter signal that corresponds to each pickup angle;

determining the pickup angle at each of the plurality of locations at which a value of the jitter signal has a minimum value; and when reproducing data, adjusting the pickup angle based upon a current location of the pickup unit and the pickup angle at which the smallest jitter signal was detected while proximate to the current location.

18. A method of determining if an optical disc is a tilted disc and reproducing data recorded on the optical disc, the method comprising:

positioning a pickup unit at a first predetermined location on an inner circumference of an optical disc;

radiating light on the optical disc at the first predetermined location;

moving the pickup unit away from the optical disc;

moving the pickup unit towards the optical disc;

measuring a time T1 at which a first focus error signal, generated when light is reflected from a recording layer of the optical disc, is output;

positioning the pickup at a second predetermined location on an outer circumference of the optical disc;

radiating light on the optical disc at the second predetermined location;

moving the pickup unit away from the optical disc;

moving the pickup unit towards the optical disc;

measuring a time T2 at which a second focus error signal, generated when light is reflected from the recording layer of the optical disc, is output;

determining a tilt degree indicating value T, using the measured times T1 and T2; and comparing the tilt degree indicating value T with a predetermined reference value R to determine if the optical disc is tilted; and if the disc is determined to be a tilted disc, restricting a maximum reproduction speed to a predetermined reproduction speed when data recorded on the optical disc is being reproduced.

* * * * *

UNITED STATES PATENT AND TRADEMARK OFFICE
CERTIFICATE OF CORRECTION

PATENT NO. : 7,224,655 B2  
APPLICATION NO. : 10/700471  
DATED : May 29, 2007  
INVENTOR(S) : Bong-Hwoan Choi It is certified that error appears in the above-identified patent and that said Letters Patent is hereby corrected as shown below:

Column 10, Line 12, change "(n+1 )-th" to --(n+1)-th--.

Signed and Sealed this

Sixth Day of November, 2007

JON W. DUDAS  
*Director of the United States Patent and Trademark Office*

UNITED STATES PATENT AND TRADEMARK OFFICE
CERTIFICATE OF CORRECTION

PATENT NO.        : 7,224,655 B2
APPLICATION NO. : 10/700471
DATED             : May 29, 2007
INVENTOR(S)       : Bong-Hwoan Choi It is certified that error appears in the above-identified patent and that said Letters Patent is hereby corrected as shown below:

Column 10, Line 10, change "location." to --location,--.

Signed and Sealed this

Fifth Day of February, 2008

JON W. DUDAS
*Director of the United States Patent and Trademark Office*